(12) United States Patent
Rogers et al.

(10) Patent No.: US 11,415,467 B2
(45) Date of Patent: Aug. 16, 2022

(54) BEAD STRINGING APPARATUS FOR LINEAR THERMAL SENSORS

(71) Applicant: Kidde Technologies, Inc., Wilson, NC (US)

(72) Inventors: Aaron Stanley Rogers, Surf City, NC (US); Daniel James Galway, Wilson, NC (US)

(73) Assignee: KIDDE TECHNOLOGIES, INC., Wilson, NC (US)

( * ) Notice: Subject to any disclaimer, the term of this patent is extended or adjusted under 35 U.S.C. 154(b) by 413 days.

(21) Appl. No.: 16/542,555

(22) Filed: Aug. 16, 2019

(65) Prior Publication Data
US 2021/0048349 A1    Feb. 18, 2021

(51) Int. Cl.
| | |
|---|---|
| *B23P 19/00* | (2006.01) |
| *G01K 5/58* | (2006.01) |
| *H01B 17/58* | (2006.01) |
| *G01K 7/04* | (2006.01) |

(52) U.S. Cl.
CPC ............... *G01K 5/58* (2013.01); *B23P 19/00* (2013.01); *B23P 19/001* (2013.01); *B23P 19/004* (2013.01); *B23P 19/008* (2013.01); *H01B 17/58* (2013.01); *G01K 7/04* (2013.01)

(58) Field of Classification Search
CPC ....... B23P 19/00; B23P 19/001; B23P 19/004; B23P 19/008; D04D 1/04; G01K 5/58; G01K 7/04; H01B 17/58
USPC ................................................... 29/433, 241
See application file for complete search history.

(56) References Cited

U.S. PATENT DOCUMENTS

| | | | |
|---|---|---|---|
| 244,452 A | 7/1881 | Halstenbach | |
| 1,866,634 A | 7/1932 | Eisler | |
| 2,587,916 A | 3/1952 | Squier | |
| 2,640,631 A * | 6/1953 | Litterio | D04D 9/00 223/48 |
| 2,641,389 A * | 6/1953 | Bagdon | D04D 1/04 223/48 |
| 2,885,130 A * | 5/1959 | Spool | D04D 1/04 223/48 |
| 3,004,690 A | 10/1961 | Spool | |
| 3,133,345 A * | 5/1964 | Shaw | A01K 95/00 43/44.9 |

(Continued)

FOREIGN PATENT DOCUMENTS

| | | |
|---|---|---|
| DE | 102011012681 | 1/2014 |
| KR | 101747036 B1 | 6/2017 |

OTHER PUBLICATIONS

European Search Report fo European Application No. 19212732.2; dated Jun. 17, 2020; 5 pages.

*Primary Examiner* — Christopher M Koehler
(74) *Attorney, Agent, or Firm* — Cantor Colburn LLP

(57) ABSTRACT

A sleeving apparatus includes a worm gear. The worm gear has a plurality of threads, the worm gear receptive of a bead between adjacent threads of the plurality of threads. A plurality of flexible diaphragms are positioned along the worm gear. Each diaphragm of the plurality of diaphragms is configured to position a wire in alignment with a central bead opening of the bead. With rotation of the worm gear about a worm gear axis, the bead advances onto the wire with the wire passing into the central bead opening. The plurality of diaphragms are configured to allow passage of the bead through each diaphragm of the plurality of diaphragms.

20 Claims, 3 Drawing Sheets

(56) References Cited

U.S. PATENT DOCUMENTS

| | | | | |
|---|---|---|---|---|
| 3,196,064 A | * | 7/1965 | Tell .......................... | B44F 9/08 |
| | | | | 156/272.4 |
| 3,907,180 A | * | 9/1975 | Birk ........................ | D04D 9/00 |
| | | | | 29/241 |
| 4,280,266 A | * | 7/1981 | Tomita ..................... | D04D 1/04 |
| | | | | 29/241 |
| 4,785,521 A | * | 11/1988 | Ho .......................... | D04D 1/04 |
| | | | | 29/241 |
| 6,455,781 B1 | | 9/2002 | Tong | |
| 7,046,116 B2 | | 5/2006 | Damaschke et al. | |
| 2006/0088079 A1 | | 4/2006 | Hom et al. | |

* cited by examiner

BEAD STRINGING APPARATUS FOR LINEAR THERMAL SENSORS

BACKGROUND

Exemplary embodiments pertain to the art of linear thermal sensors, and more particularly to apparatus and methods of installing insulating media for linear thermal sensors.

Linear thermal sensors typically use an insulating media that surrounds a center wire and are saturated in a thermal responding chemical material. The insulation material is often a ceramic material. These linear thermal sensors are biased via the center wire with an outer metal tube designated as the ground reference.

Various linear thermal sensor manufacturing techniques such as extrusion of the ceramic media, manual feeding ceramic sleeves and drawing a glass media onto the center wire have all been utilized in practice. Each of them has design limitations associated with fracturing or limitations that restrict reacting chemical distribution due to the manufacturing techniques employed.

The current automated manufacturing method for sleeving ceramic media or beads onto a center wire utilizes a feeder, a trough and pulley mechanism and a series of solenoid based contacts to hold and release the ceramic beads along the wire. This approach utilizes a lot of moving parts and is prone to jamming from a number of design weaknesses.

BRIEF DESCRIPTION

In one embodiment a sleeving apparatus includes a worm gear. The worm gear has a plurality of threads, the worm gear receptive of a bead between adjacent threads of the plurality of threads. A plurality of flexible diaphragms are positioned along the worm gear. Each diaphragm of the plurality of diaphragms is configured to position a wire in alignment with a central bead opening of the bead. With rotation of the worm gear about a worm gear axis, the bead advances onto the wire with the wire passing into the central bead opening. The plurality of diaphragms are configured to allow passage of the bead through each diaphragm of the plurality of diaphragms.

Additionally or alternatively, in this or other embodiments each diaphragm of the plurality of diaphragms includes a central diaphragm opening configured to position the wire.

Additionally or alternatively, in this or other embodiments each diaphragm of the plurality of diaphragms includes a diaphragm rim defining an outer boundary of the diaphragm, and a plurality of flexible members extending inwardly from the diaphragm rim to the central diaphragm opening.

Additionally or alternatively, in this or other embodiments adjacent diaphragm members are separated at least partially along their length from the diaphragm rim to the central diaphragm opening.

Additionally or alternatively, in this or other embodiments the plurality of members are configured to move independently.

Additionally or alternatively, in this or other embodiments the plurality of members is a plurality of flaps.

Additionally or alternatively, in this or other embodiments the plurality of members vary in size and/or shape.

Additionally or alternatively, in this or other embodiments the plurality of diaphragms are formed from an elastomeric material.

Additionally or alternatively, in this or other embodiments the plurality of diaphragms are circular.

Additionally or alternatively, in this or other embodiments the worm gear is configured such that a pitch between adjacent threads of the plurality of treads is greater than a bead length of the bead.

Additionally or alternatively, in this or other embodiments a hopper is positioned above the worm gear configured to feed the bead onto the worm gear.

Additionally or alternatively, in this or other embodiments a spool is configured to receive a sleeved wire.

In another embodiment, a method of installing one or more beads onto a wire includes positioning one or more beads between adjacent threads of a worm gear, positioning a wire along a length of the worm gear via a plurality of flexible diaphragms, rotating the worm gear about a worm gear axis thus advancing the one or more beads onto the wire and urging the one or more beads along the wire and through the plurality of diaphragms via rotation of the worm gear about the worm gear axis.

Additionally or alternatively, in this or other embodiments the one or more beads are dispensed onto the worm gear from a hopper.

Additionally or alternatively, in this or other embodiments the wire is supported via a central diaphragm opening in each diaphragm of the plurality of diaphragms, the wire therefore positioned relative to a central bead opening of the one or more beads.

Additionally or alternatively, in this or other embodiments the one or more beads are advanced onto the wire via the central bead opening.

Additionally or alternatively, in this or other embodiments the one or more beads are urged through the plurality of diaphragms via a plurality of flexible members formed in each diaphragm of the plurality of diaphragms.

Additionally or alternatively, in this or other embodiments the plurality of flaps extend from a diaphragm rim to a central diaphragm opening, the plurality of members separated at least partially along their length.

Additionally or alternatively, in this or other embodiments the worm gear is configured such that a pitch between the adjacent threads is greater than a bead length of the bead.

Additionally or alternatively, in this or other embodiments the wire and the one or more beads are wound onto a spool.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
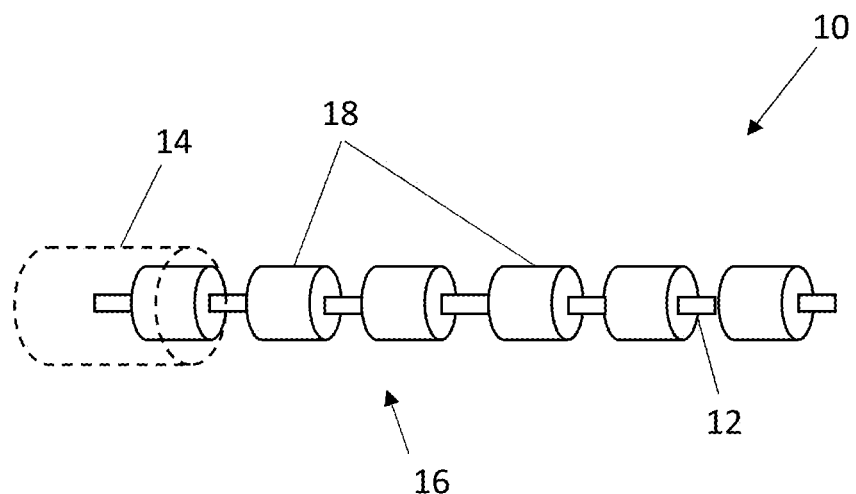
FIG. 1 is a partial perspective view of an embodiment of a linear thermal sensor.
Figure 2:
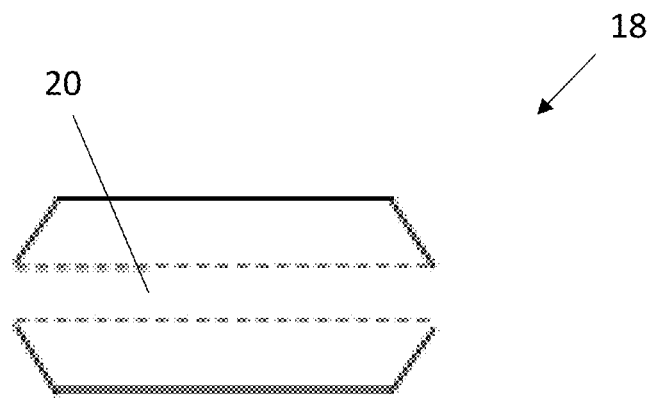
FIG. 2 is a cross-sectional view of an insulative bead of a linear thermal sensor.

FIG. 1 is a partial perspective view of a linear thermal sensor 10. The sensor 10 includes one or more wires 12 enclosed in a metallic housing 14 with an insulative layer 16 located between the one or more wires 12 and the metallic housing 14. The insulative layer 16 is formed from a plurality of beads 18, in some embodiments ceramic beads 18, strung along the one or more wires 12. Referring to FIG. 2, each of the beads 18 has a central bead opening 20 through which the one or more wires 12 is fed. In some embodiments, the central bead opening 20 is chamfered to allow for easier feeding of the beads 18 onto the wires 12.

Figure 3:
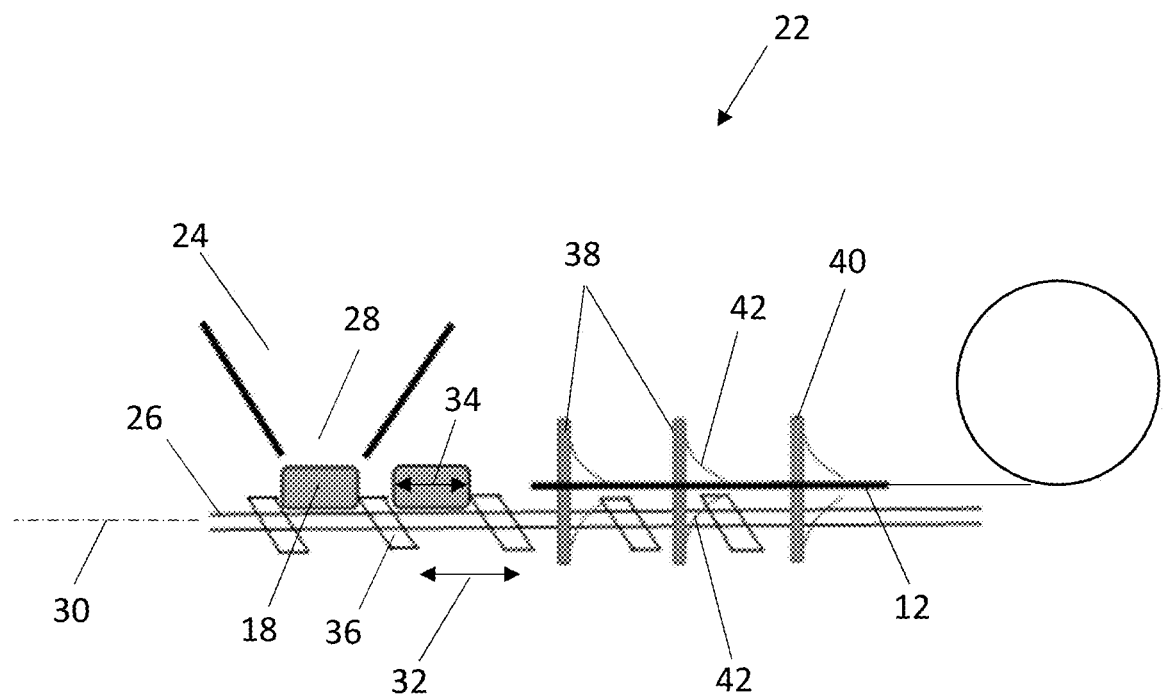
FIG. 3 is a schematic view of an embodiment of a sleeving apparatus.

Referring to FIG. 3, the beads 18 are sleeved onto the wire 12 via a sleeving apparatus 22. The sleeving apparatus 22 includes a hopper 24 into which the beads 18 are held for sleeving. The beads 18 are fed from the hopper 24 to a worm gear 26 vertically below the hopper 24. The beads 18 drop from the hopper 24 onto the worm gear 26 via a hopper opening 28. The worm gear 26 rotates about a gear axis 30 and has a thread pitch 32 greater than a bead length 34 of the bead 18, such that when dropped from the hopper 24 via the hopper opening 28 the bead 18 rests between axially-adjacent threads 36 of the worm gear 26. The threads 36 have a thread height large enough to retain the bead 18 between the adjacent threads 36.

The wire 12 is positioned along the worm gear 26 and as the worm gear 26 is rotated about the gear axis 28, the beads 18 advance toward and onto the wire 12. A plurality of diaphragms 38 are located along the worm gear 26 and are configured to position the wire 12 to align the wire 12 with the central bead openings 20 of the beads, while allowing the beads 18 to pass through the diaphragm 38 while the beads 18 advance along the worm gear 26. In some embodiments, the diaphragms 38 are formed from a flexible material such as an elastomeric material or silicone rubber.

Figure 4:
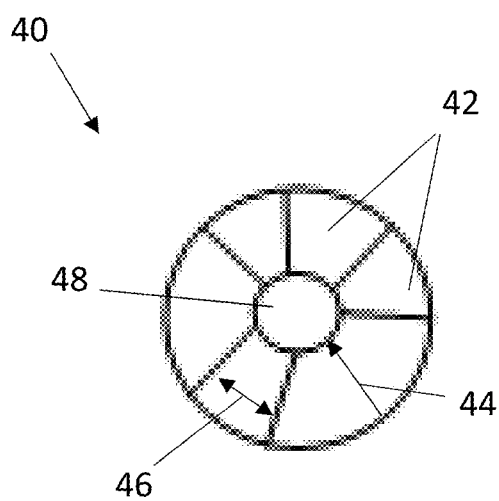
FIG. 4 is a plan view of an embodiment of a diaphragm for a sleeving apparatus.

Referring to the plan view of FIG. 4, an exemplary diaphragm 38 includes a diaphragm rim 40 defining an outer boundary of the diaphragm 38. A plurality of members, such as diaphragm flaps 42, extend inwardly from the diaphragm rim 40 toward the wire 12. In some embodiments, the diaphragm rim 40 is formed from a first material and the diaphragm flaps 42 are formed from a second material having reduced stiffness compared to the first material. The diaphragm flaps 42 each have a radial length 44 and a circumferential width 46, and adjacent diaphragm flaps 42 are separated at least partially along their radial length 44 allowing the diaphragm flaps 42 to move independently. The diaphragm flaps 42 define a central diaphragm opening 48 through which the wire 12 passes. The central diaphragm opening 48 positions the wire 12 to align the wire 12 with the central bead openings 20. Referring again to FIG. 3, once the bead 18 is sleeved onto the wire 12, the bead 18 is advanced along the wire 12 by the worm screw 26 and passes through the diaphragms 38 via the flexible diaphragm flaps 42. While in the embodiment of FIGS. 3 and 4 the diaphragm 38 includes a plurality of diaphragm flaps 42, in other embodiments other structures may be utilized. For example, in some embodiments, the diaphragm 38 may include an array of fibers or bristles extending inwardly from the diaphragm rim 40. The array of fibers or bristles have sufficient flexibility to allow for passage of the bead 18 therethrough, while still positioning the wire 12.

Once sleeved onto the wire 12, the bead 20 and wire 12 assembly may be passed along a linear trolley, or alternatively wound onto a spool 46 as shown in FIG. 3.

Referring again to FIG. 4, in some embodiments the diaphragm 38, in particular the diaphragm rim 40 is circular. It is to be appreciated, however, that in other embodiments other diaphragm shapes, such as oval, rectangular, triangular or the like may be used. Further, the embodiment of FIG. 4 illustrates six diaphragm flaps 42 extending radially inwardly from the diaphragm rim 40 toward the central diaphragm opening 48. It is to be appreciated, however, that other quantities of diaphragm flaps 42, for example, three, eight or more diaphragm flaps 42 may be utilized to provide the desired flexibility and positioning of the wire 12. Further, while in the embodiment of FIG. 4, the diaphragm flaps 42 are of unequal size depending on their circumferential position around the central diaphragm opening 48, in other embodiments the diaphragm flaps 42 may be identically shaped. While described herein in the context of manufacturing a linear thermal sensor 10, it is to be appreciated that the sleeving apparatus 22 may be utilized in the manufacture of other articles, in particular articles in which beads are sleeved onto a wire, string, filament or the like.

Figure 5:
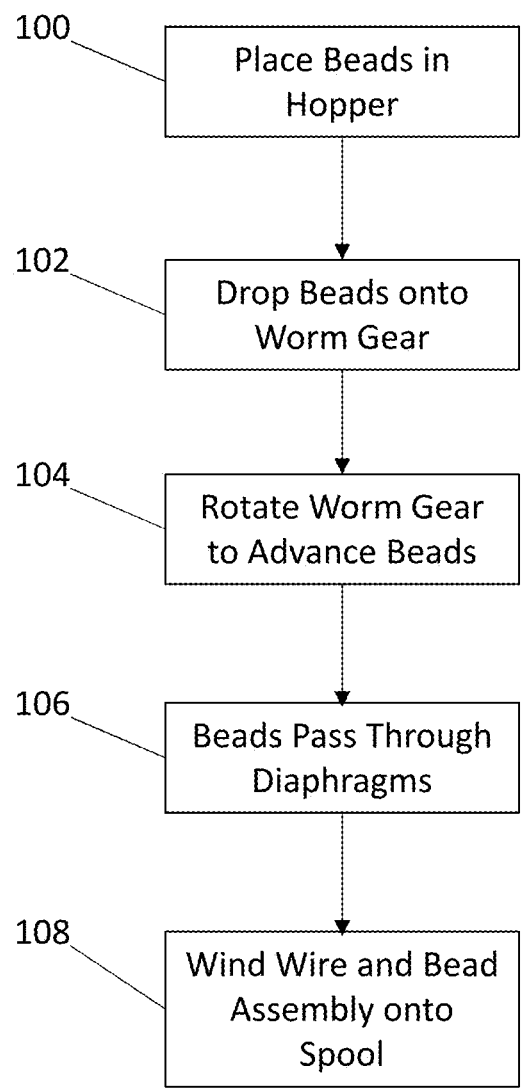
FIG. 5 is a schematic diagram of an embodiment of a method of manufacturing a linear thermal sensor.

In the block diagram of FIG. 5, a method of manufacturing a linear thermal sensor is illustrated. In block 100, a plurality of beads 18 are placed in a hopper 24. In block 102, the beads 18 are dropped onto a worm gear 26 and positioned between threads of the worm gear 26. In block 104, the worm gear 26 is rotated, thus advancing the beads 18 along the worm gear 26 and onto a wire 12. As the beads 18 advance onto the wire 12, the beads 18 pass through a plurality of flexible diaphragms 38 at block 106. The flexible diaphragms 38 are configured to position the wire 12 relative to the central bead openings 20 of the beads 18, while allowing the beads 18 to advance along the worm gear 26 and through the plurality of diaphragms 38. In some embodiments, in block 108, the wire 12 and bead 18 assembly is then wound onto a spool.

The use of the worm gear 26 and the diaphragms 38 as disclosed herein results in a manufacturing apparatus and process that is simple, cost effective, and reduces complexity of the sleeving operation of the plurality of beads 18 onto the wire 12. Further, such an apparatus and method significantly reduce the manual operation necessary to perform such an assembly.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A sleeving apparatus comprising:
   a worm gear, the worm gear having a plurality of threads, the worm gear receptive of a bead between adjacent threads of the plurality of threads; and
   a plurality of flexible diaphragms positioned along the worm gear, each diaphragm of the plurality of diaphragms configured to position a wire in alignment with a central bead opening of the bead;
   wherein with rotation of the worm gear about a worm gear axis the bead advances onto the wire with the wire passing into the central bead opening, the plurality of diaphragms configured to allow passage of the bead through each diaphragm of the plurality of diaphragms.

2. The sleeving apparatus of claim 1, wherein each diaphragm of the plurality of diaphragms includes a central diaphragm opening configured to position the wire.

3. The sleeving apparatus of claim 2, wherein each diaphragm of the plurality of diaphragms includes:
   a diaphragm rim defining an outer boundary of the diaphragm; and
   a plurality of flexible members extending inwardly from the diaphragm rim to the central diaphragm opening.

4. The sleeving apparatus of claim 3, wherein adjacent flexible members are separated at least partially along their length from the diaphragm rim to the central diaphragm opening.

5. The sleeving apparatus of claim 3, wherein the plurality of flexible members are configured to move independently.

6. The sleeving apparatus of claim 3, wherein the plurality of flexible members is a plurality of flaps.

7. The sleeving apparatus of claim 3, wherein the plurality of flexible members vary in size and/or shape.

8. The sleeving apparatus of claim 3, wherein the plurality of diaphragms are formed from an elastomeric material.

9. The sleeving apparatus of claim 3, wherein the plurality of diaphragms are circular.

10. The sleeving apparatus of claim 1, wherein the worm gear is configured such that a pitch between adjacent threads of the plurality of treads is greater than a bead length of the bead.

11. The sleeving apparatus of claim 1, further comprising a hopper disposed above the worm gear configured to feed the bead onto the worm gear.

12. The sleeving apparatus of claim 1 further comprising a spool to receive a sleeved wire.

13. A method of installing one or more beads onto a wire, comprising:
   positioning one or more beads between adjacent threads of a worm gear;
   positioning a wire along a length of the worm gear via a plurality of flexible diaphragms;
   rotating the worm gear about a worm gear axis thus advancing the one or more beads onto the wire;
   urging the one or more beads along the wire and through the plurality of diaphragms via rotation of the worm gear about the worm gear axis.

14. The method of claim 13, further comprising dropping the one or more beads onto the worm gear from a hopper.

15. The method of claim 13, further comprising supporting the wire via a central diaphragm opening in each diaphragm of the plurality of diaphragms, the wire therefore positioned relative to a central bead opening of the one or more beads.

16. The method of claim 13, wherein the one or more beads are advanced onto the wire via the central bead opening.

17. The method of claim 13, further comprising urging the one or more beads through the plurality of diaphragms via a plurality of flexible members formed in each diaphragm of the plurality of diaphragms.

18. The method of claim 17, wherein the plurality of flexible members extend from a diaphragm rim to a central diaphragm opening, the plurality of flexible members separated at least partially along their length.

19. The method of claim 13, wherein the worm gear is configured such that a pitch between the adjacent threads is greater than a bead length of the bead.

20. The method of claim 13, further comprising winding the wire and the one or more beads onto a spool.

* * * * *